United States Patent
Hashigaya et al.

(10) Patent No.: US 9,758,008 B2
(45) Date of Patent: Sep. 12, 2017

(54) AIR CONDITIONING SYSTEM FOR VEHICLES

(71) Applicant: SUZUKI MOTOR CORPORATION, Shizuoka (JP)

(72) Inventors: Hideki Hashigaya, Shizuoka (JP); Kensuke Momose, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 1179 days.

(21) Appl. No.: 13/867,232

(22) Filed: Apr. 22, 2013

(65) Prior Publication Data
US 2013/0292482 A1 Nov. 7, 2013

(30) Foreign Application Priority Data
May 2, 2012 (JP) ................................. 2012-105433

(51) Int. Cl.
*B60H 1/00* (2006.01)
(52) U.S. Cl.
CPC ..... *B60H 1/00007* (2013.01); *B60H 1/00785* (2013.01); *B60H 1/00835* (2013.01); *B60H 1/00885* (2013.01)
(58) Field of Classification Search
CPC ........... B60H 1/00007; B60H 1/00821; B60H 1/00835
See application file for complete search history.

(56) References Cited

U.S. PATENT DOCUMENTS 4,408,278 A * 10/1983 Saito .................. B60H 1/00735
237/5
5,775,415 A * 7/1998 Yoshimi ............. B60H 1/00821
165/202

(Continued)

FOREIGN PATENT DOCUMENTS

JP 8-276718 A 10/1996
JP 08276718 A * 10/1996

(Continued)

OTHER PUBLICATIONS

Yang, KR 2002-0002847 A English machine translation, Jan. 10, 2002.*

(Continued)

*Primary Examiner* — Alissa Tompkins
*Assistant Examiner* — Phillip E Decker
(74) *Attorney, Agent, or Firm* — Rothwell, Figg, Ernst & Manbeck, P.C.

(57) ABSTRACT

In an air conditioning system, a control unit controls an adjusting unit to adjust a ratio between an amount of a first part of introduced air passing through a heater core and an amount of a second part of the introduced air bypassing the heater core to a first ratio at which the amount of the first part of the introduced air decreases from a maximized amount of the first part of the introduced air according to an increase in temperature of the heater core by a warming unit. When a setting temperature for air conditioning is increased by an input unit, the control unit controls the adjusting unit to change the ratio from the first ratio to a second ratio at which the amount of the first part of the introduced air increases.

2 Claims, 10 Drawing Sheets

(56) References Cited

U.S. PATENT DOCUMENTS

| | | | | |
|---|---|---|---|---|
| 6,173,902 | B1* | 1/2001 | Bauer | B60H 1/00864 236/49.3 |
| 6,192,698 | B1* | 2/2001 | Kakehashi | B60H 1/00064 165/203 |
| 6,397,615 | B1* | 6/2002 | Kawai | B60H 1/00821 236/91 C |
| 6,908,225 | B2* | 6/2005 | Tsukamoto | F01P 11/16 701/30.7 |
| 7,113,548 | B2* | 9/2006 | Tanaka | H04L 1/06 375/219 |
| 7,650,927 | B2* | 1/2010 | Burns | B60H 1/00835 237/12.3 A |
| 9,261,282 | B2* | 2/2016 | Hadzidedic | F24D 5/02 |
| 2008/0073057 | A1* | 3/2008 | Kojima | B60H 1/00735 701/36 |
| 2010/0190429 | A1* | 7/2010 | Dage | B60H 1/00849 700/282 |
| 2011/0067419 | A1* | 3/2011 | Aoyagi | B60H 1/005 62/133 |
| 2011/0223507 | A1* | 9/2011 | LaVen | H01M 8/04029 429/437 |
| 2012/0009859 | A1* | 1/2012 | Wijaya | B60H 1/00849 454/75 |
| 2013/0291577 | A1* | 11/2013 | Miyakoshi | B60H 1/00007 62/151 |
| 2015/0114016 | A1* | 4/2015 | Ota | B60H 1/00821 62/133 |

FOREIGN PATENT DOCUMENTS

| | | | |
|---|---|---|---|
| KR | 2002-0002847 A | * | 1/2002 |
| KR | 10-2011-0136094 | * | 12/2011 |

OTHER PUBLICATIONS

Yu, KR 10-2011-0136094 A English machine translation, Dec. 21, 2011.*

Notice of Allowance mailed Jun. 16, 2015 in corresponding Chinese Patent Application No. 201310156657.2 (2 pages).

The First Office Action mailed Jan. 7, 2015 in corresponding Chinese Patent Application No. 201310156657.2 (with an English translation) (10 pages).

* cited by examiner

FIG. 6

| OUTSIDE TEMPERATURE | TEMPERATURE-SETTING DEVIATION D | | | | | |
|---|---|---|---|---|---|---|
| | −6 | −4 | −2 | 0 | 2 | 4 | 6 |
| −10 | ... | ... | ... | +4.0 | +3.0 | +2.0 | ... |
| 0 | ... | ... | ... | +3.0 | ... | ... | ... |
| 10 | ... | 0 | 0 | +2.0 | ... | ... | ... |
| 20 | 0 | 0 | 0 | +1.0 | 0 | 0 | 0 |

FIG. 7

| HUMIDITY[%] | 0 | 20 | 40 | 60 | 80 | 100 |
|---|---|---|---|---|---|---|
| SECOND ADDITIONAL VALUE A2 | 0 | ... | ... | ... | ... | 1.0 |

DECREASE ⟵─────────────⟶ INCREASE

FIG. 9

| OUTSIDE TEMPERATURE | TEMPERATURE-SETTING DEVIATION D | | | | | | |
|---|---|---|---|---|---|---|---|
| | −6 | −4 | −2 | 0 | 2 | 4 | 6 |
| −10 | ... | ... | ... | +1.0 | +1.0 | +0.5 | ... |
| 0 | ... | ... | ... | +1.0 | ... | ... | ... |
| 10 | ... | ... | ... | +0.5 | ... | ... | ... |
| 20 | 0 | 0 | 0 | 0 | 0 | 0 | 0 |

FIRST ADDITIONAL VALUE A1a

FIG. 10

| HUMIDITY[%] | 0 | 20 | 40 | 60 | 80 | 100 |
|---|---|---|---|---|---|---|
| SECOND ADDITIONAL VALUE A2a | 0 | ... | ... | ... | ... | 0.5 |

DECREASE ⇐===================⇒ INCREASE

AIR CONDITIONING SYSTEM FOR VEHICLES

CROSS REFERENCE TO RELATED APPLICATIONS

This application is based on and claims the benefit of priority from Japanese Patent Application No. 2012-105433 filed on May 2, 2012, the disclosure of which is incorporated in its entirety by reference.

TECHNICAL FIELD

The present invention relates to technologies for controlling air conditioning in vehicles.

BACKGROUND

Air conditioning systems are installed in vehicle cabins for controlling air conditioning in the vehicle cabins to thereby maintain occupant comfort therein.

Each of the air conditioning systems is normally designed to move an air mix damper, in other words, an air mix door, to an appropriate position to adjust the amount of air passing through a heater core to control the temperature of air blown out from the corresponding air conditioning system, thus controlling air conditioning in the vehicle cabin.

For such an air conditioning system, there are needs to provide occupant comfort in the vehicle cabin as soon as possible, and to reduce occupant's operations of the air conditioning system. If air conditioning systems meet these needs, they can enhance their marketability. An example of an air conditioning system aiming to meet these needs is known in Japanese Patent Application Publication No. H08-276718.

The known air conditioning system installed in a vehicle is provided with means for storing therein preset temperatures as cabin temperatures corresponding to running conditions of the vehicle; the running conditions include cabin temperatures, outside temperatures, amounts of solar radiation, and vehicle speeds. Even if a current running condition is changed to another running condition, the storing means permits a driver to run the vehicle under a suitable cabin temperature that meets the changed running condition without occupant's changing operations of the preset temperatures. Specifically, the known air conditioning system is designed to receive a temperature Ts set by a temperature setter, and read out one of the preset temperatures Ts' stored in the storing means if the temperature Ts matches a predetermined reference temperature. Then, the air conditioning system is designed to control the cabin temperature based on the preset temperature Ts' read from the storing means. The disclosed design of the known air conditioning system provides occupant comfort without occupant's changing operations of the preset temperatures.

In engine-driven vehicles, air conditioning systems use the residual heat from their engines as the heating energy of air conditioning. Increasing engine efficiency of the engine-driven vehicles reduces the residual heat from their engines. Thus, an increase in fuel consumption is required to increase the heating energy of air conditioning, resulting in reduction of gas mileage.

In electric vehicles, such as electric-powered vehicles and hybrid vehicles, air conditioning systems usually use electric heaters, such as PTC (Positive Temperature Coefficient) heaters, heat pumps with electric compressors, and the like as a heating source. Thus, an increase in power consumption by the electric heaters is required to increase the heating energy of air conditioning, resulting in reduction of electric mileage.

Then, in order to improve gas mileage or electric mileage, one type of air conditioning systems is designed to calculate an amount of heat currently needed, and operate a heating source by a minimum amount of power, i.e. a minimum amount of fuel or a minimum amount of electric power, required to generate the amount of heat currently needed without operating its heating source by a large amount of power required to generate a sufficient amount of heat.

SUMMARY

In the aforementioned air conditioning system, which is designed to drive the heating source by a minimum amount of power required to generate an amount of heat currently needed, if an occupant turns up a current temperature setting for the air conditioning system to a target temperature setting to increase the heating performance of the air conditioning system, there is a need to increase the rate of operating the heating source. The increase in the rate of operating the heating source aims to increase the temperature of air blown out from the air conditioning system up to a target temperature deter mined based on the target temperature setting.

However, the increase in the rate of operating the heating source may require a certain amount of time until the temperature of air blown out from the air conditioning system reaches the target temperature setting.

Particularly, air conditioning systems of some vehicles that place importance on improvement of gas mileage or electric mileage are each designed to operate a heating source by a minimum amount of power required to generate an amount of heat currently needed while the air mix damper is continuously set to a "MAX-HOT" position. Note that, when the air mix damper is set to the MAX-HOT position, all air, which has passed through the evaporator, passes through the heater core heated by the heating source. In other words, the MAX-HOT position is a fully open position of the air mix damper.

Because the air mix damper is continuously set to the MAX-HOT position, the opening of the air mix damper cannot be adjusted in order to increase the temperature of air blown out from the air conditioning system up to the target temperature setting. Thus, only an increase in the rate of operating the heating source is required to increase the temperature of air blown out from the air conditioning system up to the target temperature setting. This results in a certain amount of time needed until the temperature of air blown out from the air conditioning system reaches the target temperature setting. The delay of the increase of the temperature of air blown out from the air conditioning system relative to the timing when the occupant turns up the current temperature setting for the air conditioning system to the target temperature setting may cause occupant discomfort.

In view of the circumstances set forth above, one aspect of the present invention seeks to provide air conditioning systems designed to address the problem set forth above.

Specifically, an alternative aspect of the present invention aims to provide such air conditioning systems, each of which is capable of increasing the temperature of air blown out from the air conditioning system as early as possible in response to an occupant's request to turn up a current temperature setting for the air conditioning system.

According to an exemplary aspect of the present invention, there is provided an air conditioning system for warming at least part of air introduced therein using a heater core to supply temperature-conditioned air to a cabin of a vehicle. The air conditioning system includes an adjusting unit configured to adjust a ratio between an amount of a first part of the introduced air passing through the heater core and an amount of a second part of the introduced air bypassing the heater core. The adjusting unit is configured to adjust the ratio to an initial ratio at which the amount of the first part of the introduced air is maximized. The air conditioning system includes an outside temperature measuring unit configured to measure an outside temperature out of the cabin, and an input unit configured to input a temperature setting for air conditioning of the cabin when operated. The air conditioning system includes a warming source for warming the heater core, and a first control unit configured to control an operation of the warming source to warm the heater core based on the inputted temperature setting and the measured outside temperature such that: a temperature of the heater core increases as an absolute value of a deviation between a predetermined reference temperature setting and the temperature setting decreases; and the temperature of the heater core increases as the measured outside temperature decreases. The air conditioning system includes a second control unit configured to: control the adjusting unit to adjust the ratio to a first ratio at which the amount of the first part of the introduced air decreases from the maximized amount of the first part of the introduced air according to an increase in temperature of the heater core by the warming unit; and, when the temperature setting is increased by the input unit, control the adjusting unit to change the ratio from the first ratio to a second ratio at which the amount of the first part of the introduced air increases.

In a first example of the exemplary aspect of the present invention, the first control unit is configured to: determine a target temperature setting for the warming source by adding a value to the inputted temperature setting such that: the temperature of the heater core increases as the absolute value of the deviation between the predetermined reference temperature setting and the temperature setting decreases; and the temperature of the heater core increases as the measured outside temperature decreases; and control the operation of the warming source based on the target temperature setting for the warming source to warm the heater core.

The air conditioning system according to a second example of the exemplary aspect of the present invention further includes a limiting unit configured to limit an operation range of the warming source with respect to the temperature setting and the measured outside temperature according to information inputted to the air conditioning system.

The air conditioning system according to a third example of the exemplary aspect of the present invention further includes a humidity measuring unit configured to measure a value of a humidity in the cabin. The first control unit is configured to operate the warming source to warm the heater core such that: the temperature of the heater core increases as the absolute value of the deviation between the predetermined reference temperature setting and the temperature setting decreases; the temperature of the heater core increases as the measured outside temperature decreases; and the temperature of the heater core increases as the measured value of the humidity increases.

The air conditioning system according to the exemplary aspect of the present invention adjusts the temperature of the temperature-conditioned air to be supplied to the cabin to a temperature correlating with the inputted temperature setting by controlling the ratio between the amount of the first part of the introduced air passing through the heater core and that of the second part of the introduced air bypassing the heater core without changing the ratio of operating the warming source.

Specifically, when the temperature setting is increased by the input unit, the configuration controls the adjusting unit to change the ratio from the first ratio to the second ratio at which the amount of the first part of the introduced air increases. This control results in an increase in the temperature of the air supplied to the cabin as early as possible in response to the increase in the temperature setting.

In the air conditioning system according to the exemplary aspect of the present invention, the first control unit is adapted to predict the possibility that the setting temperature is changed using the deviation between the inputted temperature setting and the reference temperature setting. Thus, it is possible to prevent unnecessary operations of the warming source.

The air conditioning system according to the exemplary aspect of the present invention is configured such that the first control unit controls the operation of the warming source based on the outside temperature. This configuration increases the temperature of the heater core as soon as possible if the heater core is difficult to increase in temperature due to low outside temperature, thus adjusting the temperature of the temperature-conditioned air to be supplied to the cabin to a temperature correlating with the inputted temperature setting as immediately as possible.

In the first example of the exemplary aspect of the present invention, the first control unit deter mines the target temperature setting on which the warming source is operated by simply adding, to the inputted temperature setting, a value defined based on: the deviation between the predetermined reference temperature setting and the temperature setting; and the outside temperature.

In the second example of the exemplary aspect of the present invention, the limiting unit limits the operation range of the warming source with respect to the temperature setting and the measured outside temperature according to information inputted to the air conditioning system from, for example, an occupant. This allows an occupant to easily prevent deterioration of gas mileage and/or electric mileage due to frequent operations of the warming source.

In the air conditioning system according to the third example of the exemplary aspect of the present invention, the first control unit is adapted to predict the possibility that an occupant changes the temperature setting to dehumidify air in the cabin using the measured value of the humidity in the cabin, and to control the operation of the warming source to warm the heater core according to predicted possibility. Thus, the air conditioning system can dehumidify air in the cabin as immediately as possible in response to an occupant's requirement to dehumidify air in the cabin.

BRIEF DESCRIPTION OF THE DRAWINGS

Other aspects of the present invention will become apparent from the following description of embodiments with reference to the accompanying drawings in which:

FIG. 6 is a table schematically illustrating an example of the set of first additional values that can be calculated based on a control function using, as variables, an outside temperature and a deviation between an occupant's inputted temperature setting and a comfort temperature setting according to the first embodiment;

FIG. 7 is a table schematically illustrating an example of the set of second additional values that can be calculated based on a control function using a measured value of the humidity in a cabin as a variable according to the first embodiment;

FIG. 9 is a table schematically illustrating an example of the set of first additional values that can be calculated in the subroutine illustrated in FIG. 8 when an ECO switch is in an on state according to the second embodiment, and FIG. 10 is a table schematically illustrating an example of the set of second additional values that can be calculated in the subroutine illustrated in FIG. 8 when the ECO switch is in the on state according to the second embodiment.

DETAILED DESCRIPTION OF EMBODIMENT

Embodiments of the present invention will be described hereinafter with reference to the accompanying drawings.

First, an air conditioning system according to a first embodiment of the present invention, which is installed in a hybrid vehicle as an example of vehicles, will be described.

Figure 1:
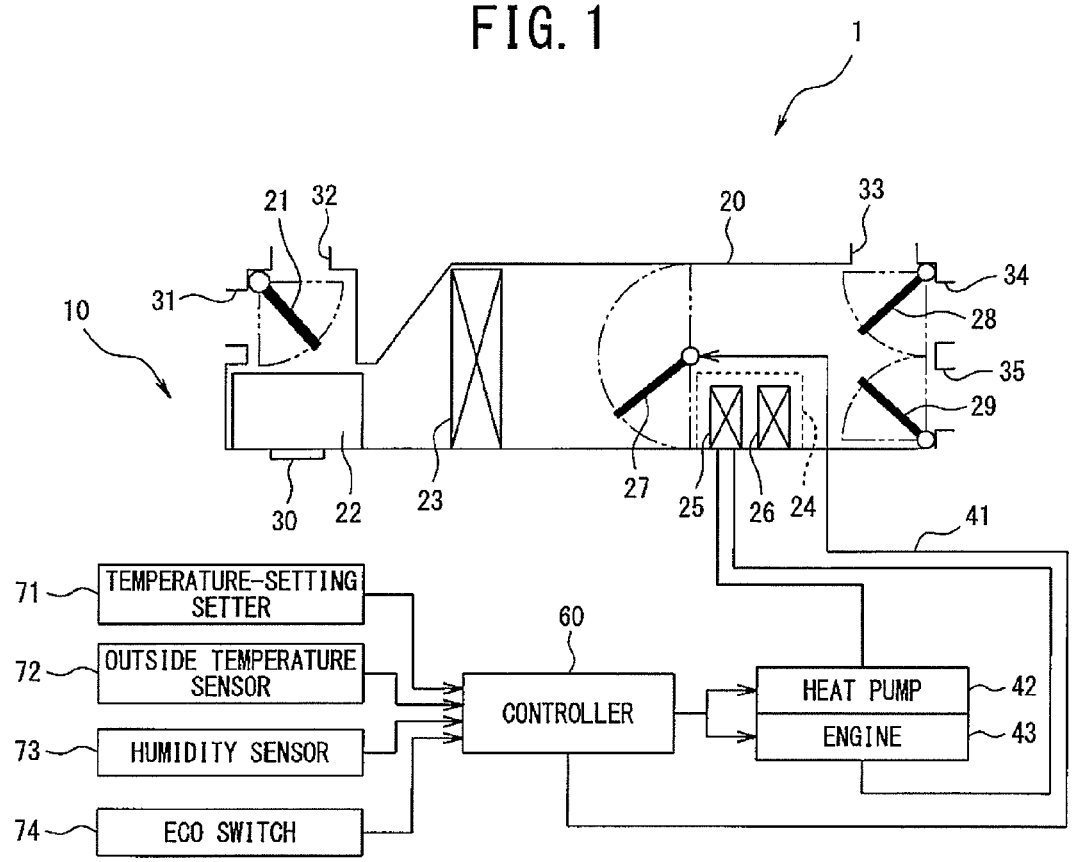
FIG. 1 is a view schematically illustrating a structural example of an air conditioning system installed in a vehicle according to a first embodiment of the present invention.

FIG. 1 schematically illustrates a structural example of an air conditioning system 10 installed in a vehicle 1.

Referring to FIG. 1, the air conditioning system 10 includes an air conditioning unit 20 and a controller 60.

The air conditioning unit 20 is provided with a duct for introducing air, i.e. conditioned air, into a cabin of the vehicle 1. The air conditioning unit 20 is comprised of a blower fan, i.e. an air-conditioning fan, 22, an evaporator core 23, a warming unit, i.e. a heating unit, 24, an air mix door, in other words, and an air mix damper, 27; these components 22, 23, 24, and 27 are arranged in the duct.

The duct is provided at one end with an outside-air introduction port 31, an inside-air introduction port 32, and a switching door 21.

The switching door 21 includes an actuator, and is designed to be rotatable by the actuator between a first position where the outside-air introduction port 31 is fully closed and a second position where the inside-air introduction port 32 is fully closed. For example, the air conditioning system 10 is adapted to operate in an inside-air introduction mode for introducing air inside the vehicle 1 into the duct, i.e. the air conditioning unit 20, and an outside-air introduction mode for introducing air outside the vehicle 1 into the duct. That is, the switching door 21 is rotated up to the first position if the air conditioning system 10 operates in the inside-air introduction mode, and is rotated up to the second position if the air conditioning system 10 operates in the outside-air introduction mode.

The blower fan 22 is disposed between the evaporator core 23 and each of the outside-air and inside-air introduction ports 31 and 32.

The blower fan 22 is connected to a blower-fan motor 30 that rotates the blower fan 22 to introduce air inside or outside the vehicle 1 into the duct via the outside-air introduction port 31 or the inside-air introduction port 32, thus transferring the introduced air to the evaporator core 23.

The evaporator core 23 allows an exchange of heat to take place between liquid-state refrigerant and air transferred from the blower fan 22 and passing through the evaporator core 23, so that the air passed through the evaporator core 23 is cooled and dehumidified. That is, the evaporator core 23, a compressor (not shown), a condenser (not shown), an expansion valve, and so on constitute a refrigerant cycle. In the refrigerant cycle, a refrigerant is compressed by the compressor, so that a high-pressurized refrigerant discharged from the compressor enters the condenser. The high-pressurized refrigerant is condensed by the condenser, so that a liquid-state refrigerant with a low temperature is discharged from the condenser. The liquid-state refrigerant with the low temperature enters the expansion valve, and, in the expansion valve, the liquid-state refrigerant is sprayed into the evaporator core 23, so that the liquid-state refrigerant is evaporated. The evaporation of the liquid-state refrigerant extracts heat of the evaporator core 23, thus cooling the evaporator core 23, in other words, cooling and dehumidifying air passing through the evaporator core 23. After the evaporation, the refrigerant is transferred to the compressor, so that the refrigerant is compressed again by the compressor. The compressor 30 is designed to be selectively operated by the controller 60, so that, if the compressor 30 is being not operated, the air entering the evaporator core 23 passes therethrough without being cooled and dehumidified.

The air mix door 27 and the heating unit 24 are arranged downstream of the evaporator core 23 in the duct. In other words, the air mix door 27 is arranged between the evaporator core 23 and the warming unit 24. Cooled and dehumidified air, referred to simply as cooled air, is directed to the air mix door 27 and the heating unit 24.

The warming unit 24 is operative to warm air passing therethrough to increase the temperature of the air. In other words, the warming unit 24 is operative to heat air passing therethrough. For example, the warming unit 24 is comprised of a heater core 25 and a PTC core 26.

The heater core 25 is communicably coupled to a heat pump 42 and an internal combustion engine, referred to simply as an engine, 43 via first and second heating-medium pipes 41.

The heat pump 42 includes a compressor (not shown) that pressurizes a heating medium, such as a refrigerant, and circulates the high-pressurized and high-temperature heating medium through the heater core 25 via the first heating-medium pipe 41 to warm, i.e. heat, the heater core 25.

The engine 43 includes a pump (not shown) that circulates a heating medium, such as a refrigerant for cooling the engine 43, through the heater core 25 via the second heating-medium pipe 41; the temperature of the refrigerant is increased based on the residual heat, i.e. the exhaust heat, from the engine 43. The circulation of the heating medium through the heater core 25 warms, i.e. heats, the heater core 25.

Note that, as described above, the first and second heating-medium pipes 41 are preferably provided to circulate a heating medium for the heat pump 42 and that for the engine 43.

The warmed and heated heater core 25 allows air passing therethrough to be warmed, i.e. heated.

The PTC heater core 26 is provided with a PTC heater having an element that produces heat when energized. The PTC heater serves as an auxiliary heater, and operates by electrical energy, i.e. electrical power, to warm i.e. heat, the PTC heater core 26. The warmed and heated PTC heater core 26 allows air passing therethrough to be warmed, i.e. heated. The electrical power by which the PTC heater core 26 operates is supplied from, for example, a battery for one or more motors of the vehicle 1.

In the air conditioning unit 20, the heat pump 42, the engine 43, and the PTC heater constitute a heating source, i.e. a warming source, 44 (see FIG. 2 described later) for heating, i.e. warming the heating unit 24.

The air mix door 27 is designed to adjust the ratio between an amount of a first part of the cooled air passing through the warming unit 24, i.e. the heater core 25 and the PTC heater core 26, and an amount of a second part of the cooled air bypassing the warming unit 24.

Specifically, in FIG. 1, the evaporator 23 stands on the bottom of the duct to extend across the entire inner width of the duct. The heater core 25 and the PCT heater core 26 are located downstream of the evaporator 23 on the bottom of the duct such that air-inlet portions of the heater cores 25 and 26 face the lower-half side of the evaporator 23.

The air mix door 27 is rotatable about an axis that extends perpendicularly to the longitudinal direction of the duct and the vertical direction of the duct in FIG. 1, and faces the center of the evaporator core 23.

Specifically, when the air mix door 27 is so rotated downward with respect to a reference position directed to the center of the evaporator core 23 as to close a part of an airflow path to the warming unit 24, an amount of the first part of the cooled air passing through the warming unit 24 is reduced. In other words, when the air mix door 27 is rotated downward with respect to the reference position to a given position lower than the reference position, an amount of the first part of the cooled air passing through the warming unit 24 is reduced, so that an amount of the second part of the cooled air bypassing the warming unit 24 is increased. The air mix door 27 can be rotated downward to a position where the air mix door 27 fully closes the airflow path to the warming unit 24, so that all the cooled air bypasses the warming unit 24. The position where the air mix door 27 fully closes the airflow path to the warming unit 24 will be referred to as a first position or MAX-COOL position hereinafter.

On the other hand, when the air mix door 27 is so rotated upward with respect to the reference position as to open the airflow path to the warming unit 24, an amount of the first part of the cooled air passing through the warming unit 24 is increased. In other words, when the air mix door 27 is rotated upward with respect to the reference position to a given position higher than the reference position, an amount of the first part of the cooled air passing through the warming unit 24 is increased, so that an amount of the second part of the cooled air bypassing the warming unit 24 is reduced. The air mix door 27 can be rotated upward to a position where the air mix door 27 fully opens the airflow path to the warming unit 24, so that all the cooled air via after passing the evaporator 23 passes through the warming unit 24, so that the cooled air is warmed, that is, heated. The position where the air mix door 27 fully opens the airflow path to the warming unit 24 will be referred to as a second position or a MAX-HOT position hereinafter.

Adjustment of the position of the air mix door 27, i.e. adjustment of a rotation angle of the air mix door 27 with respect to the reference position, produces a mixture of the heated air passed through the warming unit 24 and the cooled air that bypassed the warming unit 24 at the downstream of the air mix door 27 and the warming unit 24, so that temperature-conditioned air is produced. Note that the air mix door 27 is mechanically coupled to an A/M door actuator 45 (see FIG. 2). The A/M door actuator 45 is operative to rotate the air mix door 27 about the axis to adjust the position of the air mix door 27 between the first position and the second position.

The temperature-conditioned air is transferred to the other end of the duct.

In addition, the duct is provided at the other end with air outlets 33, 34, and 35, so that the temperature-conditioned air is guided through the duct to the air outlets 33, 34, and 35.

The air outlets 33, 34, and 35 allow the temperature-conditioned air in the air conditioning unit 20 to be supplied to the cabin of the vehicle 1. The air outlets 33, 34, and 35 include a defroster outlet opening to the windshield of the vehicle 1, a vent outlet opening to occupants in the cabin, and a front-seat foot outlet opening to the feet of occupants seated on the front seats.

The duct is also provided with mode switching doors 28 and 29. The mode switching door 28 includes an actuator and is designed to be rotatable by the actuator between a first position where the air outlet 33 is fully closed and the air outlet 34 is fully opened and a second position where the air outlet 34 is fully closed and the air outlet 33 is fully opened. The mode switching door 29 includes an actuator and is designed to be rotatable between a first position where the air outlet 35 is fully closed and a second position where the air outlet 35 is fully opened. As a result, adjustment of the position of each of the mode switching doors 28 and 29 allows an amount of the first part of the temperature-conditioned air passing through the air outlets 33 to 35 to be controlled.

The actuator of the switching door 21, the blower fan motor 30 of the blower fan 22, the A/M actuator 45 of the air mix door 27, and the actuator of each of the mode switching doors 28 and 29 are electrically connected to the controller 60. The controller 60 is operative to control these actuators, thus controlling mechanical motions of these mechanical devices 21, 22, 27, 28, and 29.

Moreover, various sensors, inputs, and switches used for control of the vehicle 1 are installed in the vehicle 1. In this embodiment, in the vehicle 1, at least a temperature-setting setter 71, an outside temperature sensor 72, a humidity sensor 73, and an ECO switch 74 are installed, and the temperature-setting setter 71, outside temperature sensor 72, humidity sensor 73, and ECO switch 74 are electrically connected to the controller 60.

The temperature-setting setter 71 is provided on an operation panel for the air conditioning system 10; the operation panel is mounted on the dashboard of the vehicle 1, so that occupants can operate the temperature-setting setter 71. Specifically, the temperature-setting setter 71 sets a desired temperature setting for the air conditioning system 10 upon an occupant's input of the desired temperature setting. The temperature-setting setter 71 is operative to output the temperature setting to the controller 60.

The outside temperature sensor 72 is operative to measure a temperature outside the vehicle 1, and output a measured outside temperature to the controller 60.

The humidity sensor 73 is operative to measure a value of the humidity in the cabin, and output a measured value of the humidity in the cabin to the controller 60.

The ECO switch 74 is designed to be operable by occupants. If the ECO switch 74 is turned on, the ECO switch 74 outputs on information to the controller 60. The on information instructs the controller 60 to operate in an eco-mode to limit activation of the air conditioning unit 20 and/or the amount of the temperature-conditioned air supplied from the air conditioning system 10. Otherwise, if the ECO switch 74 is kept off, the controller 60 operates in a normal mode to control the air conditioning unit 20 without limiting activation of the air conditioning unit 20 and/or the amount of the temperature-conditioned air supplied from the air conditioning system 10.

The controller 60 is operative to perform various tasks associated with the vehicle 1.

For example, the controller 60 is comprised of an ECU (Electronic Control Unit) including a microcomputer and its peripherals. Specifically, the controller 60 is comprised of a CPU, a ROM, a RAM, and so on. In the ROM, one or more programs are stored; the one or more programs cause the CPU to perform the various tasks using the RAM.

For example, the controller 60 functionally includes an engine control module (ECM) for controlling the engine 43, and an air-conditioning ECU for controlling air conditioning.

Figure 2:
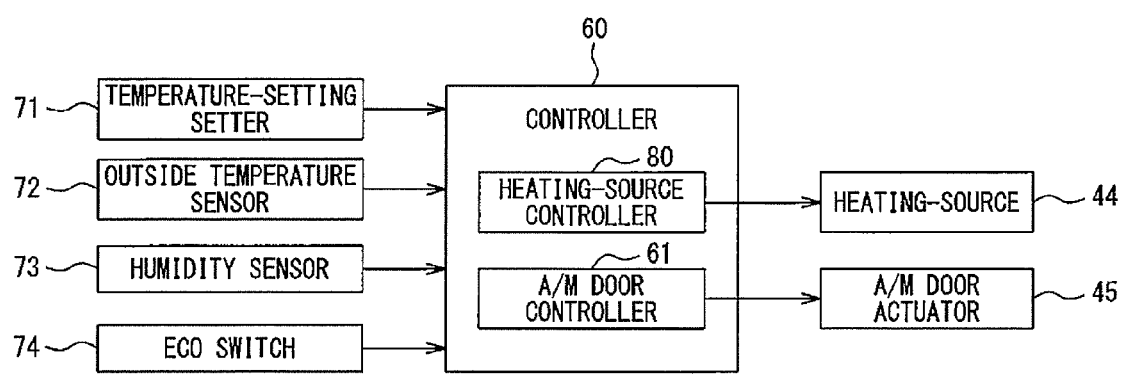
FIG. 2 is a block diagram schematically illustrating a specific structural example of the controller illustrated in FIG. 1.

FIG. 2 schematically illustrates a specific structural example of the controller 60 of this embodiment.

Referring to FIG. 2, the controller 60 functionally includes a heating-source controller 80 and an air-mix door controller, referred to as an "A/M door controller" 61. The air mix door 27 will also be referred to as an A/M door 27 hereinafter.

To the heating-source controller 80, information and measured values outputted from the temperature-setting setter 71, outside temperature sensor 72, humidity sensor 73, and ECO switch 74 are inputted. The heating-source controller 80 is operative to calculate a target temperature setting required to operate the heating source 44 using the inputted information and measured values. As described above, the heating source 44 includes the heat pump 42, engine 43, and PTC heater core 26.

Figure 3:
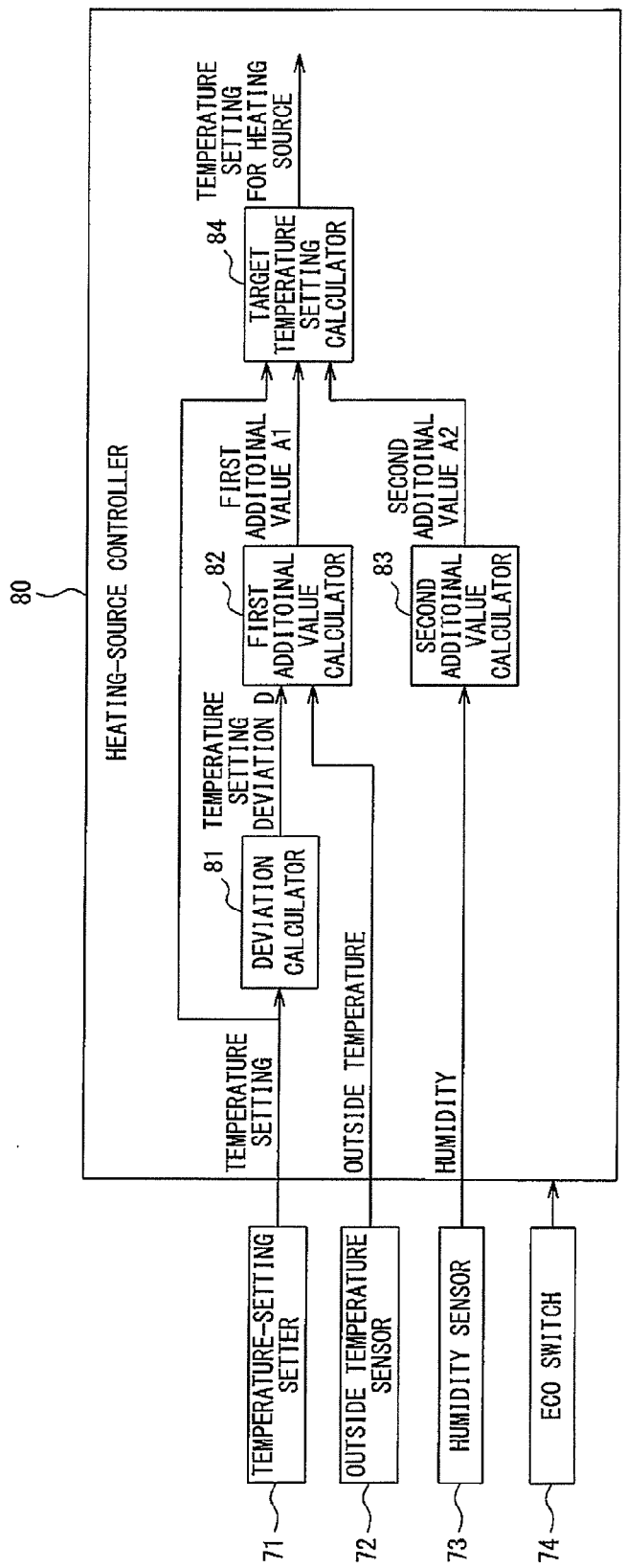
FIG. 3 is a block diagram schematically illustrating a specific structural example of a heating-source controller illustrated in FIG. 2.

FIG. 3 schematically illustrates a specific structural example of the heating-source controller 80.

Referring to FIG. 3, the heating-source controller 80 functionally includes a deviation calculator 81, a first additional-value calculator 82, a second additional-value calculator 83, and a target temperature-setting calculator 84.

The A/M door controller 61 is operative to adjust the position of the air mix door 27. Specifically, the A/M door controller 61 is operative to control the A/M door actuator 45, so that the A/M door actuator 45 actuates the A/M door 27 based on the control by the A/M door controller 61, thus adjusting the position of the air mix door 27.

Figure 4:
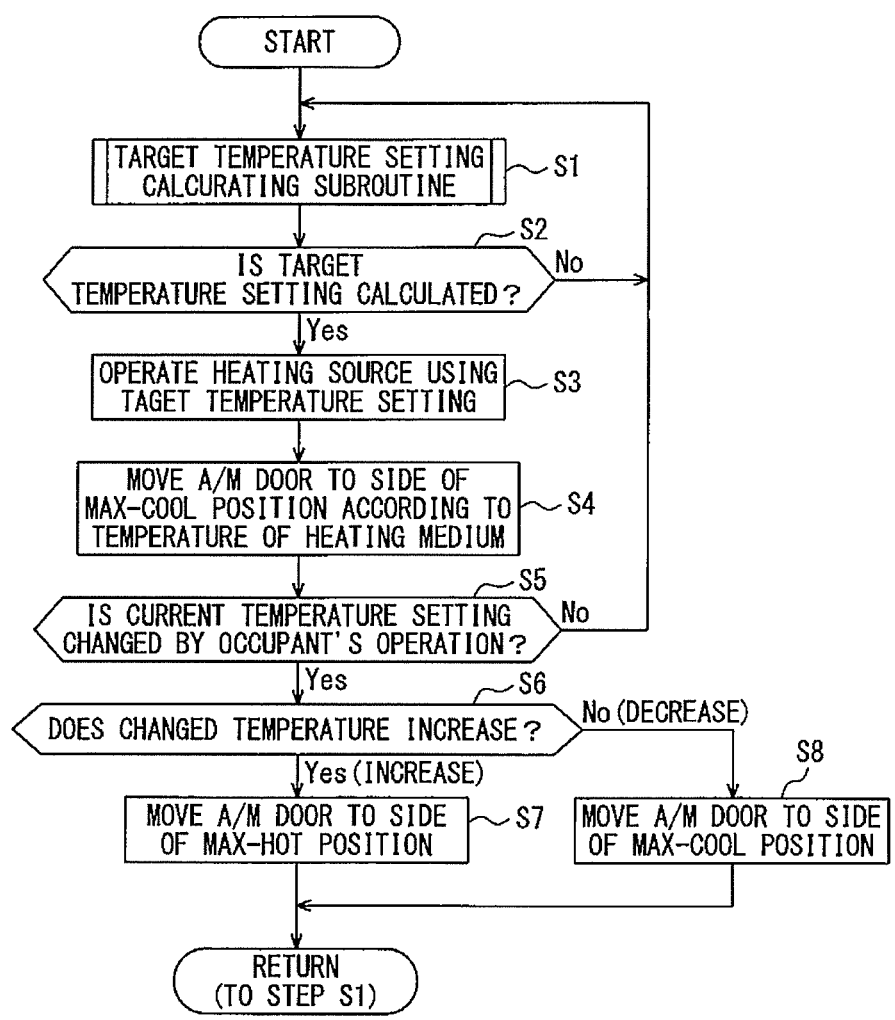
FIG. 4 is a flowchart schematically illustrating a heating-source and A/M door control routine carried out by the controller according to the first embodiment.
Figure 5:
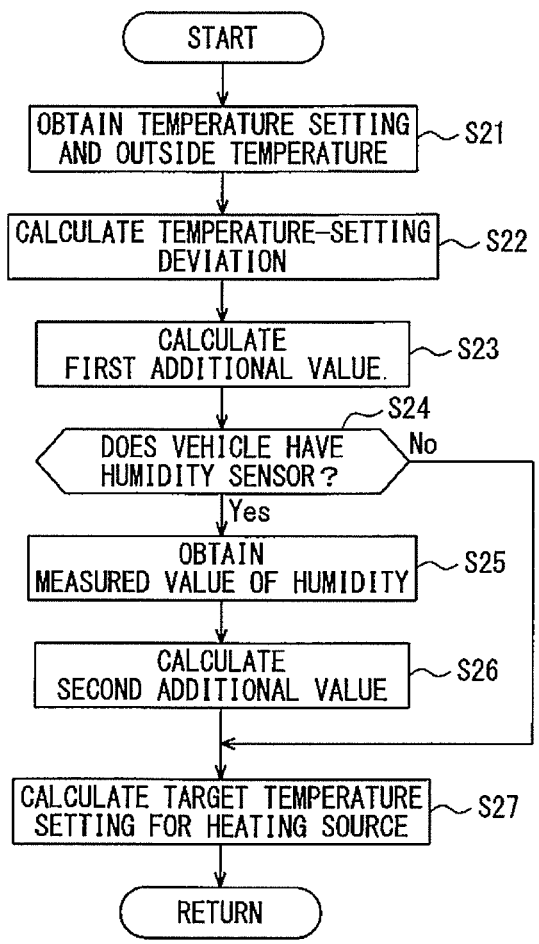
FIG. 5 is a flowchart schematically illustrating a subroutine of step S1 illustrated in FIG. 4.

FIGS. 4 and 5 schematically illustrate a heating-source and A/M door control routine carried out by the heating-source controller 80 and the A/M door controller 61 while the air conditioning system 10 operates in the normal mode. While the air conditioning system 10 operates in the normal mode, the position of the A/M door 27 is set to the MAX-HOT position as an initial position.

Specifically, FIG. 4 schematically illustrates the heating-source and A/M door control routine carried out by the heating-source controller 80 and the A/M door controller 61. FIG. 5 schematically illustrates a subroutine of step S1 in FIG. 4; the subroutine shows a specific procedure carried out by the heating-source controller 80.

The heating-source and A/M door control routine carried out by the heating-source controller 80 and the A/M door controller 61 will be described hereinafter with reference to FIGS. 3 to 5.

In step S1, the heating-source controller 80 performs the subroutine for calculation of a target temperature setting illustrated in FIG. 5 in step S1.

As illustrated in FIG. 5, the deviation calculator 81 obtains a temperature setting set by the temperature-setting setter 71, and obtains an outside temperature measured by the outside temperature sensor 72 in step S21 of the subroutine.

Next, the deviation calculator 81 calculates a deviation D between the temperature setting and a comfort temperature setting in step S22. Specifically, the deviation calculator 81 calculates the deviation D between the temperature setting and the comfort temperature setting using a control function $f1(a, b)$ given by the following equation (1):

$$D=f1(a,b)=a-b \qquad [1]$$

where a represents the temperature setting, and b represents the comfort temperature setting.

The deviation D between the temperature setting and the comfort temperature setting will also be referred to as a temperature-setting deviation D hereinafter.

Note that, as described above, the temperature setting is a temperature setting set by the temperature-setting setter 71 based on an occupant's operation of the temperature-setting setter 71. The comfort temperature setting is a temperature setting, i.e. a reference temperature setting, at which occupants are assumed to feel comfortable within the total temperature-setting range settable by an occupant via the temperature-setting setter 71. For example, the comfort temperature setting is 25° C. (degrees Celsius). A value of the comfort temperature setting can vary depending on: which manufacturer produced the air conditioning system according to this embodiment and/or which destination the air conditions system according to this embodiment was shipped to.

In step S23, the first additional-value calculator 82 calculates a first additional value A1 for the temperature setting as a function of the outside temperature obtained in step S21 and the temperature-setting deviation D calculated in step S22. Specifically, the first additional-value calculator 82 calculates the first additional value A1 using a control function $f2(c, d)$ given by the following equation (2):

$$A1(° C.)=f2(c,d) \qquad [2]$$

where c represents the outside temperature, and d represents the temperature-setting deviation D.

FIG. 6 schematically illustrates an example of the set of first additional values A1 that can be calculated based on the function $f2(c, d)$ using the outside temperature and the temperature-setting deviation D as first and second variables.

As illustrated in FIG. 6, the first additional value A1 increases as the absolute value of the temperature-setting deviation D as the second variable decreases. In other words, the first additional value A1 increases as the absolute value of the temperature-setting deviation D as the second variable approaches zero. In addition, the first additional value A1 increases as the outside temperature as the first variable decreases. In the example illustrated in FIG. 6, the first additional value A1 varies within the range from 0 (° C.) to +4.0 (° C.) depending on the variation in the outside temperature and the temperature-setting deviation D.

Next, the heating-source controller 80 determines whether the vehicle 1 has a humidity sensor, i.e. whether a value of the humidity measured by the humidity sensor 73 is inputted to the controller 60 in step S24. Upon determination that the vehicle 1 has a humidity sensor (YES in step S24), the controller 60 performs the operation in step S25. Otherwise, upon determination that the vehicle 1 has no humidity sensors (NO in step S24), the controller 60 performs the operation in step S27.

In step S25, the heating-source controller 80 obtains a measured value of the humidity measured by the humidity sensor 73.

Next, in step S26, the second additional-value calculator 83 calculates a second additional value A2 for the temperature setting as a function of the measured value of the humidity obtained in step S25. Specifically, the second additional-value calculator 83 calculates the second additional value A2 using a control function f3(e) given by the following equation (3):

$$A2(° C.) = f3(e) \quad [3]$$

where e represents the measured value of the humidity.

FIG. 7 schematically illustrates an example of the set of second additional values A2 that can be calculated based on the function f3(e) using the measured value of the humidity as a variable.

As illustrated in FIG. 7, the second additional value A2 increases as the measured value of the humidity increases. In the example illustrated in FIG. 7, the second additional value A2 varies within the range from 0 (° C.) to +1.0 (° C.) depending on the variation in the measured value of the humidity.

Following the operation in step S26, the target temperature-setting calculator 84 calculates a target temperature setting T for the heating source 44 as a function of the temperature setting, the first additional values A1 calculated in step S23, and the second additional values A2 calculated in step S26 in step S27. Specifically, the target temperature-setting calculator 84 calculates the target temperature setting T for the heating source 44 using a control function f4(a, x, y) given by the following equation (4):

$$T = f4(a,x,y) = a+x+y \quad [4]$$

where a represents the temperature setting set forth above, x is a variable representing the first additional values A1, and y is a variable representing the second additional values A2.

Note that, if the determination in step S24 is negative, the target temperature-setting calculator 84 calculates a target temperature setting T for the heating source 44 as a function of the temperature setting and the first additional values A1 calculated in step S23 in step S27. Specifically, the target temperature-setting calculator 84 calculates the target temperature setting T for the heating source 44 using a control function f4A(a, x) given by the following equation (4A):

$$T = f4A(a,x) = a+x \quad [4A]$$

After the operation in step S27, the target temperature-setting calculator 84 terminates the subroutine illustrated in FIG. 5 to thereby complete the operation in step S1, so that the heating-source and A/M door control routine proceeds to step S2.

In step S2, the heating-source controller 80 determines whether a target temperature setting has been calculated by the operation in step S1. Upon determination that a target temperature setting has been calculated (YES in step S2), the heating-source and A/M door control routine proceeds to step S3. Otherwise, upon determination that no target temperature settings have been calculated yet (NO in step S2), the heating-source and A/M door control routine returns to step S1, so that the controller 60 starts the heating-source and A/M door control routine again from the operation in step S1.

In step S3, the heating-source controller 80 operates the heating source 44 according to the target temperature setting calculated in step S1. Specifically, in step S3, the heating-source controller 80 operates the heating source 44, i.e. at least one of the heat pump 42, the engine 43, and the PTC heater core 26 by power required to increase the temperature of air passing through the warming unit 24 to the target temperature setting calculated in step S1.

Specifically, for the heat pump 42, the heating-source controller 80 operates the compressor of the heat pump 42 by a given amount of electric power required to increase the temperature of air passing through the warming unit 24 to the target temperature setting calculated in step S1. For the engine 43, the heating-source controller 80 operates the engine 43 by a given amount of air-fuel mixture required to increase the temperature of air passing through the warming unit 24 to the target temperature setting calculated in step S1. For the PTC heater core 26, the heating-source controller 80 operates the PTC heater of the PTC core by a given amount of electric power required to increase the temperature of air passing through the warming unit 24 to the target temperature setting calculated in step S1.

Next, the A/M door controller 61 controls the A/M door actuator 45, so that the A/M door actuator 45 actuates the A/M door 27 based on the control by the A/M door controller 61, thus moving the air mix door 27 from the MAX-HOT position to the side of the MAX-COOL position in step S4. As described above, the MAX-HOT position represents a position where the air mix door 27 fully opens the airflow path to the warming unit 24, so that a maximum amount of the first part of the cooled air passes through the warming unit 24.

Specifically, in step S4, the A/M door controller 61 controls the A/M door actuator 45, so that the A/M door actuator 45 actuates the A/M door 27 based on the control by the A/M door controller 61, thus moving the air mix door 27 from the MAX-HOT position to the side of the MAX-COOL position according to an increase in the warming unit 24, i.e. the heater cores 25 and 26, warmed by the warming unit 44.

Next, the controller 60, for example, the A/M door controller 61, determines whether the current temperature setting is changed to another temperature setting set by the temperature-setting setter 71 based on an occupant's operation of the temperature-setting setter 71 until a predetermined period of time has elapsed in step S5.

Upon determination that the current temperature setting is changed to another temperature setting until the predetermined period of time has elapsed (YES in step S5), the controller 60 carries out the operation in step S6. Otherwise, upon determination that the current temperature setting is unchanged to another temperature setting until the predetermined period of time has elapsed (NO in step S5), the heating-source and A/M door control routine returns to step S1, so that the controller 60 starts the heating-source and A/M door control routine again from the operation in step S1.

In step S6, the controller 60, for example, the A/M door controller 61, determines whether the changed temperature setting is higher than the previous temperature setting, in other words, the changed temperature setting increases relative to the previous temperature setting. Upon determination that the changed temperature setting is higher than the previous temperature setting (YES in step S6), the controller 60 carries out the operation in step S7. Otherwise, upon determination that the changed temperature setting is lower than the previous temperature setting (NO in step S6), the controller 60 carries out the operation in step S8.

In step S7, the A/M door controller 61 controls the A/M door actuator 45, so that the A/M door actuator 45 actuates the A/M door 27 based on the control by the A/M door controller 61, thus moving the air mix door 27 to the side of the MAX-HOT position, i.e. rotating the air mix door 27 upward in FIG. 1. Thereafter, the heating-source and A/M door control routine returns to step S1, so that the controller 60 starts the heating-source and A/M door control routine again from the operation in step S1.

In step S8, the A/M door controller 61 controls the A/M door actuator 45, so that the A/M door actuator 45 actuates the A/M door 27 based on the control by the A/M door controller 61, thus moving the air mix door 27 to the side of the MAX-COOL position, i.e. rotating the air mix door 27 downward in FIG. 1. Thereafter, the heating-source and A/M door control routine returns to step S1, so that the controller 60 starts the heating-source and A/M door control routine again from the operation in step S1.

If the air conditioning unit 20 stops the operation in the normal mode, the controller 60 or the air conditioning unit 20 is shut down, terminates the heating-source and A/M door control routine.

Next, operations of the air conditioning system 10 will be described hereinafter.

First, operations of the air conditioning system 10 before a temperature setting is changed will be described.

The air conditioning system 10 performs the subroutine for calculation of a target temperature setting to thereby calculate a target temperature setting for the heating source 44 as a function of a desired temperature setting inputted by an occupant, an outside temperature, and a value of the humidity in the cabin (see step S1 and FIG. 5). Next, the air conditioning system 10 operates the heating source 44 by power required to increase the temperature of air passing through the warming unit 24 to the target temperature setting calculated in step S1 (see steps S2 and S3). Then, the air conditioning system 10 causes the A/M door actuator 45 to move the A/M door 27 from the MAX-HOT position to the side of the MAX-COOL position (see step S4).

A temperature setting, an outside temperature, a value of the humidity in the cabin used to calculate a target temperature setting for the heating source 44 serve as parameters representing the possibility that an occupant increases a current temperature setting, i.e. a current temperature in the cabin.

Specifically, if the current temperature setting is set to be higher than the comfort temperature setting, the air conditioning system 10 can predict that the possibility that occupants increase the current temperature setting is low because the current temperature setting has already been higher than the reference temperature setting. Otherwise, if the current temperature setting is set to be lower than the comfort temperature setting, the air conditioning system 10 can predict that occupants increase the current temperature setting is low because occupants seem to be sensitive to heat and/or to place importance on gas/electric mileage.

In addition, if the outside temperature is low, that is, lower than a predetermined reference outside temperature, the air conditioning system 10 can predict that the possibility that occupants increase the current temperature setting is high. If the measured value of the humidity in the cabin is high, that is, higher than a predetermined reference humidity, the air conditioning system 10 can predict that the possibility that occupants increase the current temperature setting is high because air blown out from the air outlets 33 to 35 having a high temperature is required to defrost the windshield of the vehicle 1.

Thus, in step S3, when predicting that the possibility that occupants increase the current temperature setting is high according to the current temperature setting, the outside temperature, and the measured value of the humidity in the cabin, the air conditioning system 10 operates the heating source 44 using the target temperature setting calculated based on the current temperature setting, the outside temperature, and the measured value of the humidity in the cabin. In addition, the air conditioning system 10 causes the A/M door actuator 45 to move the A/M door 27 from the MAX-HOT position to the side of the MAX-COOL position.

The activation of the heating source 44 and movement of the A/M door 27 to the side of the MAX-COOL position from the MAX-HOT position allow part of cooled air passed through the evaporator 23 to bypass the warming unit 24, so that the part of cooled air passing through the warming unit 24 is transferred without being heated by the heating source 44. That is, if the A/M door 27 were set to the MAX-HOT position, the part of cooled air could pass through the warming unit 24, so that the part of cooled air could be heated by the hearing module 44.

This makes it possible to adjust the temperature of the air heated by the heating source 44 to a temperature substantially equivalent to the current temperature setting.

More specifically, the position of the A/M door 27 moved by the A/M door actuator 45 in step S4, i.e. the opening of the air mix door 24 relative to the MAX-HOT position, is determined to allow the temperature of air supplied to the cabin during the heating source 44 being driven to be set to the current temperature setting or thereabout. For example, the correlation between the target temperature setting and the position of the A/M door 27 can be stored in the controller 60, so that the controller 60 can move the air mix door 27 to an appropriate position via the A/M door actuator 45.

The air conditioning system 10 activates the heating source 44 using the target temperature setting therefor calculated based on a temperature setting, an outside temperature, a value of the humidity in the cabin. This makes it possible to increase the temperature of air supplied to the cabin with economy, thus preventing an adverse effect on gas/electric mileage.

In addition, the air conditioning system 10 increases the first additional value A1 with decrease in the outside temperature (see FIG. 6), thus increasing the target temperature setting for the heating source 44 (see the equation [4]). Even if the heating unit 24 is difficult to increase in temperature due to a low outside temperature, the air conditioning system 10 sets the target temperature setting for the heating source 44 to be a higher value corresponding to the low outside temperature, thus increasing the temperature of the heating unit 24 up to a temperature corresponding to a temperature corresponding to a desired temperature setting as immediately as possible.

The air conditioning system 10 increases the second additional value A2 with increase in the measured value of the humidity in the cabin (see FIG. 7), thus increasing the target temperature setting for the heating source 44 (see the equation [4]). If an occupant increases the temperature setting for dehumidification, the air conditioning system 10 dehumidifies the air in the cabin on the basis of the increase in the target temperature setting for the heating source 44 as early as possible in response to the requirement of dehumidification.

Next, operations of the air conditioning system 10 after a temperature setting is changed will be described.

If the current temperature setting is changed to be low by an occupant's operation of the temperature-setting setter 71 so that the changed temperature setting is lower than the previous temperature setting, the air conditioning system 10 further moves the A/M door 27 to the side of the MAX-COOL position (see steps S5, S6, and S8). Otherwise, if the current temperature setting is changed to be high by an occupant's operation of the temperature-setting setter 71 so that the changed temperature setting is higher than the previous temperature setting, the air conditioning system 10 moves the A/M door 27 to the side of the MAX-HOT position (see steps S5 to S7).

Specifically, when the current temperature setting is changed to be high by an occupant's operation of the temperature-setting setter 71, the air conditioning system 10 moves the A/M door 27 to the side of the MAX-HOT position immediately to thereby increase the temperature of air supplied to the cabin as early as possible in response to the occupant's requirement. Thus, if an occupant requests to increase the heating performance of the air conditioning system 10, the air conditioning system 10 moves the A/M door 27 to the side of the MAX-HOT position immediately. This results in an increase of air supplied to the cabin without depending on an increase in the rate of operating the heating source 44. Thus, the air conditioning system 10 makes it possible to ensure quick heating to thereby achieve high-level comfort in the cabin as early as possible in response to an occupant's request to increase the heating performance of the air conditioning system 10.

In addition, after movement of the A/M door 27 to the side of the MAX-HOT position or the MAX-COOL position (for example, after a given period has elapsed since the movement), the air conditioning system 10 performs the subroutine for calculation of a target temperature setting to thereby calculate a target temperature setting for the heating source 44 as a function of a desired temperature setting inputted by an occupant, an outside temperature, and a value of the humidity in the cabin (see step S1 and FIG. 5). Next, the air conditioning system 10 operates the heating source 44 by power required to increase the temperature of air passing through the warming unit 24 to the target temperature setting calculated in step S1 (see steps S2 and S3). Then, the air conditioning system 10 causes the A/M door actuator 45 to move the A/M door 27 from the MAX-HOT position to the side of the MAX-COOL position (see step S4).

Second Embodiment

Next, an air conditioning system according to a second embodiment of the present invention will be described. In the second embodiment, parts identical to those of the first embodiment, to which like reference characters are assigned, are omitted or simplified to avoid redundant description.

The structure and/or functions of the air conditioning system according to the second embodiment are mainly identical to those of the air conditioning system 10 according to the first embodiment except for the following points. So, the different points will be mainly described hereinafter.

The air conditioning system according to the second embodiment is designed to change the first additional value and second additional value according to on or off state of the ECO switch 74.

Figure 8:
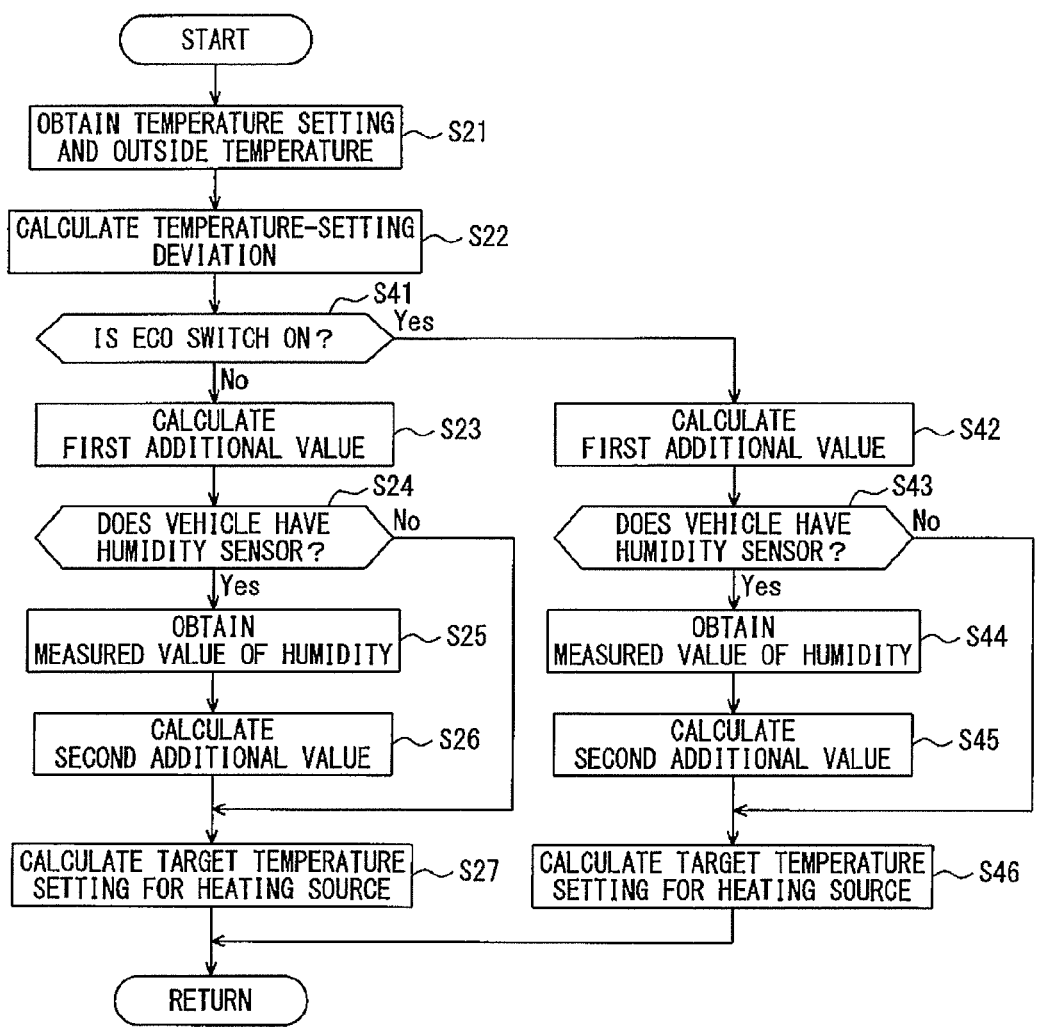
FIG. 8 is a flowchart schematically illustrating a subroutine of step S1 illustrated in FIG. 4 according to a second embodiment of the present invention.

FIG. 8 schematically illustrates a subroutine of step S1 in FIG. 4 for calculating a target temperature setting for the heating source 44 according to this embodiment.

Referring to FIG. 8, in the subroutine illustrated in FIG. 8, operations in steps S41 to S46 are added to the position after step S22 of the subroutine illustrated in FIG. 5. The added operations in steps S41 to S46 will be described hereinafter.

After the calculation of the temperature-setting deviation D in step S22, the heating-source controller 80 determines whether the ECO switch 74 is in an on state in step S41. Upon determination that the ECO switch 74 is in an on state (YES in step S41), the subroutine proceeds to step S42. Otherwise, upon determination that the ECO switch 74 is in an off state (NO in step S41), the subroutine proceeds to step S23 set forth above.

In step S42, the first additional-value calculator 82 calculates a first additional value A1$a$ for the temperature setting as a function of the outside temperature obtained in step S21 and the temperature-setting deviation D calculated in step S22 in the same approach as the operation in step S23. However, in step S42, the first additional-value calculator 82 calculates the first additional value A1$a$ using a control function f2$a$ different from the control function f2. Specifically, in step S42, the first additional-value calculator 82 calculates the first additional value A1$a$ such that the first additional value A1$a$ is lower than the first additional value A1 calculated in step S23.

FIG. 9 schematically illustrates an example of the set of first additional values A1$a$ that can be calculated based on the function f2$a$ using the outside temperature and the temperature-setting deviation D as first and second variables.

As illustrated in FIG. 9, the first additional value A1$a$ increases as the absolute value of the temperature-setting deviation D as the second variable decreases. In other words, the first additional value A1$a$ increases as the absolute value of the temperature-setting deviation D as the second variable approaches zero. In addition, the first additional value A1$a$ increases as the outside temperature as the first variable decreases. However, the first additional values A1$a$ calculated in step S42 are respectively lower than the corresponding first additional values A1 calculated in step S23. Specifically, in the example illustrated in FIG. 9, the first additional value A1$a$ varies within the range from 0 (° C.) to +1.0 (° C.) depending on the variation in the outside temperature and the temperature-setting deviation D.

Next, the heating-source controller 80 deter mines whether the vehicle 1 has a humidity sensor in step S43 in the same approach as the operation in step S24. Upon determination that the vehicle 1 has a humidity sensor (YES in step S43), the controller 60 performs the operation in step S44. Otherwise, upon deter urination that the vehicle 1 has no humidity sensors (NO in step S43), the controller 60 performs the operation in step S46.

In step S44, the heating-source controller 80 obtains a measured value of the humidity measured by the humidity sensor 73 in the same approach as the operation in step S25.

Next, in step S45, the second additional-value calculator 83 calculates a second additional value A2$a$ for the temperature setting as a function of the measured value of the humidity obtained in step S44 in the same approach as the operation in step S26. However, in step S45, the second additional-value calculator 83 calculates the second additional value A2a using a control function f3a different from the control function f3. Specifically, in step S45, the second additional-value calculator 83 calculates the second additional value A2a such that the second additional value A2a is lower than the second additional value A2 calculated in step S26.

FIG. 10 schematically illustrates an example of the set of second additional values A2a that can be calculated based on the function f3a using the measured value of the humidity as a variable.

As illustrated in FIG. 10, the second additional value A2a increases as the measured value of the humidity increases. However, the second additional values A2a calculated in step S45 are respectively lower than the corresponding second additional values A2 calculated in step S26. Specifically, in the example illustrated in FIG. 10, the second additional value A2a varies within the range from 0 (° C.) to +0.5 (° C.) depending on the variation in the measured value of the humidity.

Following the operation in step S45, the target temperature-setting calculator 84 calculates a target temperature setting T for the heating source 44 as a function of the temperature setting, the first additional values A1a calculated in step S42, and the second additional values A2a calculated in step S45 in step S46. Specifically, the target temperature-setting calculator 84 calculates the target temperature setting T for the heating source 44 using a control function f4(a, x, y) given by the following equation (4):

$$T=f4(a,x,y)=a+x+y \quad [4]$$

where a represents the temperature setting set forth above, x is a variable representing the first additional values A1a, and y is a variable representing the second additional values A2a.

Note that, if the determination in step S43 is negative, the target temperature-setting calculator 84 calculates a target temperature setting T for the heating source 44 as a function of the temperature setting and the first additional values A1a calculated in step S42 in step S46. Specifically, the target temperature-setting calculator 84 calculates the target temperature setting T for the heating source 44 using a control function f4A(a, x) given by the following equation (4A):

$$T=f4A(a,x)=a+x \quad [4A]$$

Then, the target temperature-setting calculator 84 terminates the subroutine illustrated in FIG. 8 to thereby complete the operation in step S1. Thereafter, the controller 80 performs the operations in steps S2 to S8 illustrated in FIG. 4 set forth above.

As described above, the air conditioning system according to the second embodiment is configured to set each of the first and second additional values to a value lower than a normal value to thereby set a target temperature setting for the heating source 44 to a value lower than a normal value when the ECO switch 74 is in the on state. The normal value for each of the first and second additional values is for example a value calculated by the air conditioning system when the ECO switch 74 is in the off state, and the normal value for the target temperature setting is for example a value calculated by the air conditioning system when the ECO switch 74 is in the off state.

This configuration makes it possible to limit the rate of operating the heating source 44 during the ECO switch 74 being in the on state in comparison to the rate of operating the heating source 44 during the ECO switch 74 being in the off state.

Thus, the air conditioning system according to the second embodiment allows an occupant to select which of quick heating and gas/electric mileage to which a higher priority is given, thus operating the air conditioning system in accordance with an occupant's desired priority between quick heating and gas/electric mileage.

In the aforementioned first and second embodiments, the A/M door 27 for example serves as an adjusting unit for adjusting a ratio between an amount of a first part of the introduced air passing through the heater cores 25 and 26 and an amount of a second part of the introduced air bypassing the heater cores 25 and 26, and the outside temperature sensor 72 for example serves as an outside temperature measuring unit. The heating-source controller 80 for example serves as a first control unit, and the A/M door controller 61 for example serves as a second control unit. The humidity sensor 73 for example serves as a humidity measuring unit, and the operations in steps S41 to S46 for example serve as a limiting unit.

The present invention is not limited to each of the first and second embodiments, and therefore, various modifications of each of the first and second embodiments can be included in the present invention.

In each of the first and second embodiments, the air conditioning system is configured to calculate a target temperature setting for the heating source 44 using the specific equations [1] to [4] and the specific tables illustrated in FIGS. 6 and 7 or FIGS. 9 and 10, and activate the heating source 44 based on the calculated target temperature setting. However, the present invention is not limited to the configuration. Specifically, an air conditioning system according to a modification can be configured to change a target temperature setting for the heating source 44 such that the target temperature setting increases as: the absolute value of the deviation between a temperature setting set by the temperature-setting setter 71 and a predetermined comfort temperature decreases; and the outside temperature decreases.

While an illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An air conditioning system for warming at least part of air introduced therein using a heater core to supply temperature-conditioned air to a cabin of a vehicle, the air conditioning system comprising:
    an adjusting unit configured to adjust a ratio between an amount of a first part of the introduced air passing through the heater core and an amount of a second part of the introduced air bypassing the heater core, the adjusting unit being configured to adjust the ratio to an initial ratio at which the amount of the first part of the introduced air is maximized;
    an outside temperature measuring unit configured to measure an outside temperature out of the cabin;
    an input unit configured to input a temperature setting for air conditioning of the cabin when operated;
    a warming source for warming the heater core;

a first control unit including a deviation calculator and a first additional-value calculator, the first control unit further including a target temperature-setting calculator, the deviation calculator is configured to receive the temperature setting input by the input unit and to calculate a deviation between a predetermined reference temperature setting and the temperature setting, the first additional-value calculator is configured to receive the deviation calculated by the deviation calculator and the outside temperature measured by the outside temperature measuring unit and to calculate a first additional value, the target temperature-setting calculator is configured to add the temperature setting to the first additional value calculated by the first additional-value calculator to determine a target temperature setting, and the first control unit is configured to control an operation of the warming source to warm the heater core based on the target temperature setting; and a second control unit configured to:
    control the adjusting unit to adjust the ratio to a first ratio at which the amount of the first part of the introduced air decreases from the maximized amount of the first part of the introduced air according to an increase in temperature of the heater core by the warming source; and
    when the temperature setting is increased by the input unit, control the adjusting unit to change the ratio from the first ratio to a second ratio at which the amount of the first part of the introduced air increases;

wherein the air conditioning system further comprises:
a humidity measuring unit configured to measure a value of a humidity in the cabin,
wherein the first control unit includes a second additional-value calculator configured to receive the values of a humidity measured by the humidity measuring unit to calculate a second additional value,
the target temperature-setting calculator is configured to add the second additional value calculated by the second additional-value calculator to the temperature setting and the first additional value to determine a target temperature setting,
the first control unit is configured to control the operation of the warming source to warm the heater core based on the target temperature setting such that:
    the temperature of the heater core increases as the absolute value of the deviation between the predetermined reference temperature setting and the temperature setting decreases;
    the temperature of the heater core increases as the measured outside air decreases; and
    the temperature of the heater core increases as the measured value of the humidity increases.

2. The air conditioning system according to claim 1, wherein the first control unit comprises:
    a limiting unit configured to limit an operation range of the warming source with respect to the temperature setting and the measured outside temperature according to information inputted to the air conditioning system.

* * * * *